United States Patent [19]
Studer et al.

[11] Patent Number: 5,158,797
[45] Date of Patent: Oct. 27, 1992

[54] PROCESS FOR PRODUCING SPREADABLE BUTTER WITH A REDUCED FAT CONTENT

[76] Inventors: Fritz Studer, Sonnenhalde 1, 8603 Schwerzenbach; Werner von Rotz, Tuffenwies 21, 8064 Zurich, both of Switzerland

[21] Appl. No.: 432,474

[22] Filed: Nov. 7, 1989

[30] Foreign Application Priority Data

Nov. 7, 1988 [CH] Switzerland .............. 04129/88

[51] Int. Cl.$^5$ .............................................. A23C 15/16
[52] U.S. Cl. .................................. 426/581; 426/586; 426/650
[58] Field of Search .................... 426/581, 586, 650

[56] References Cited

U.S. PATENT DOCUMENTS 1,583,294  5/1926  Kohman .............................. 426/650
2,878,126  3/1959  Roberts .............................. 426/586

Primary Examiner—Jeanette Hunter
Assistant Examiner—Helen Pratt
Attorney, Agent, or Firm—Bachman & LaPointe

[57] ABSTRACT

The low calorie butter consists of choice grade or table butter, a first aqueous phase with a slightly acidic buffer substance and a second aqueous phase with milk albumens. A quantity of choice grade and/or table butter corresponding to a butter fat content of up to 60% by weight, based on the end product, is brought to a processing temperature of 15° to 25° C. and, is pushed in a tightly sealable machine by cutting blades operating with a high shearing force. During the subsequent mixing and kneading of the finely cut choice grade and/or table butter composition the first aqueous phase with 2 to 8% by weight, based on the end product, of natural lactic acid concentrate which buffers the aqueous phase of the end product to a pH of 5 to 6.5 is firstly added, then the second aqueous phase with 4 to 10% by weight, based on the end product, of alkali and/or alkaline earth caseinate is added. The components are mixed thoroughly by the kneading operation with a rise in temperature of 3° to 5° C. brought about by frictional heat.

12 Claims, No Drawings

PROCESS FOR PRODUCING SPREADABLE BUTTER WITH A REDUCED FAT CONTENT

BACKGROUND OF THE INVENTION

The invention relates to a process for producing spreadable butter with a reduced fat content from choice grade or table butter, a first aqueous phase with a slightly acid buffer substance and a second aqueous phase with milk proteins.

A butter is described as choice grade butter, also known as special table butter, if it has been produced in an extremely careful manner from pasteurized, centrifugally separated cream, generally with addition of lactic acid bacteria cultures and after appropriate ripening, and is distinguished by superior quality and a long shelf life. Firms which produce or improve and sell special butter are generally subjected to bacteriological/chemical inspections by official laboratories. A special butter factory has continuously to observe the legal limits for the fat content, the degree of acidity and the table salt content. Furthermore, the standards for shelf life and biological and organoleptic testing have to be complied with.

Table butter is butter which is produced from pasteurized, centrifugally separated cream, in open vat-ripened cream or wheycream, and is also perfect with respect to smell and taste.

Whether they are to be used as a spread for bread or in the kitchen, choice grade and table butter are a valuable addition to staple foods. They both essentially contain more than 80% by weight of butter fat, usually 83% by weight. Butter fat contains numerous saturated and unsaturated fatty acids. Physically, butter is a water-in-oil emulsion.

Although butter plays an important role as a food owing to its digestibility, its taste, and its provision of essential fatty acids, the high calorie content is often feared. Therefore, there is currently a trend to produce and offer butters with fewer calories. However, this gives rise to obstacles not only with respect to production but also with respect to taste and not least legislation, because butter and products derived from it have to meet particularly high requirements.

EP-A1 0062938 describes a water-in-oil emulsion based on butter fat, with a low calorie content, in which the lipid phase has a content of 30 to 80%, based on the total composition, and consists of an unsaturated solid butter fraction. The aqueous phase of the emulsion has a pH of 4.0 to 7.0 and makes up 20 to 70% of the total composition. According to a particular embodiment, the low melting point fraction which is obtained from butter fat at a temperature of 20° to 30° C. is used.

EP-A1 0098663 describes a process for producing a spread for bread in which cream, an oil-in-water emulsion, is firstly produced. This cream contains 35 to 70% of an aqueous phase and 25 to 65% of fat with a specific solids profile. The cream is then churned at a temperature which allows the fat to exist, at least in part, in crystallized form, while avoiding an air/water interface. This increase in the viscosity allows at least partial phase reversal, producing a spread for bread which has substantially the same fat content as the cream used as educt. This spread for bread contains a network of coherent fat and enclosed as well as free aqueous phase. A spread for bread of the appropriate composition is also claimed. Skimmed milk and butter fat are mentioned in addition to other components of non-animal origin as starting materials for the production of the cream emulsion.

According EP-A1 0098664, an oil-in-water emulsion is firstly produced from a fat-containing phase and an aqueous solution for producing a spread for bread from a water-in-oil emulsion having a fats content of at most 60%. This emulsion is then shaken vigorously and cooled, coated agents which have been coated internally with a hydrophobic material or have been produced from a hydrophobic material being used to crystallize out the fat and to obtain a spread from a water-in-oil emulsion. Dairy cream is mentioned as an example of the starting material consisting of an oil-in-water emulsion. For producing the oil-in-water emulsion, skimmed milk is heated to 60° C. and melted butter as well as other additives are added. After pasteurization, cooling and stirring, the cooled mass is converted into a water-in-oil emulsion in a crystallizing vessel filled with butter fat at 18° to 20° C. while applying very high shearing forces, so that phase reversal takes place.

The known processes for producing spreadable butter with a reduced fat content employ either only a butter fat fraction or cream emulsions of the oil-in-water type are firstly produced and are at least partially converted into water-in-oil emulsions.

SUMMARY OF THE INVENTION

The inventors have set themselves the object of providing a process for producing spreadable butter with a reduced fat content of the type mentioned at the outset, which contains all components of choice grade or table butter and can be produced simply and inexpensively without phase conversion. The butter produced according to the invention should also remain unchanged with respect to the taste and the appearance, should contain the essential fatty acids of the choice grade or table butter and should be preservable for at least twenty days at a storage temperature of 5° to 8° C. without a change of taste, even without preservatives.

DETAILED DESCRIPTION

According to the invention, the object is achieved in that a quantity of choice grade and/or table butter corresponding to a butter fat content of up to 60% by weight, based on the end product, is brought to a processing temperature of 15° to 25° C., is beaten in a tightly sealable machine by cutting blades operating with a high shearing force and, during the subsequent mixing the kneading of the finely cut choice grade and/or table butter mass the first aqueous phase with 2 to 8% by weight, based on the end product, of natural lactic acid concentrate which buffers the aqueous phase of the end product to a pH of 5 to 6.5 is firstly added, then the second aqueous phase with 4 to 10% by weight, based on the end product, of alkali and/or alkaline earth caseinate is added, the components being mixed thoroughly by the kneading operation with a rise in temperature of 3° to 5° C. brought about by frictional heat.

Horizontally or vertically operating machines which are known in the foods industry and allow an adjustable throughput through cutting blades are used for cutting (beating) the choice grade and/or table butter. The advance is produced, for example by conveying spirals or screws. In addition to a cutting, mixing and kneading part and the above-mentioned conveyors, such a machine comprises loading and emptying devices, driving units and control devices. For example, meat cutters for producing sausages or soft cheese production machinery can be used.

It has proven advantageous to work under a vacuum, for example of 0.2 to 0.9 bar, in the cutting, mixing and kneading part. The consistency and the spreadability of the low calorie butter can thus be improved in comparison with a mixing process taking place at normal pressure.

A quantity of choice grade and/or table butter corresponding to a butter fat content of 30 to 50% by weight, in particular 40 to 45% by weight, is preferably brought to a temperature of 18° to 22° C. When carrying out the process according to the invention on an industrial scale, it is particularly advantageous to use choice grade and/or table butter directly from the butter churn or continuous butter making machine, and to bring the temperature from 14° to 15° C. to the processing temperature required in the machine.

The temperature should not be too high at the beginning of the cutting, mixing and kneading process, as a rise in temperature brought about by frictional heat in the above-mentioned range of 3° to 5° C. takes place owing to the energy of the blades during the homogenization of the butter and during the subsequent mixing and kneading.

The mixing and kneading of the finely cut special or table butter with the first and then the second aqueous phase generally lasts 2 to 8 minutes. This processing period applies to addition in one batch as well as to batch-wise or continuous addition of each of the aqueous phases.

The first aqueous phase, the lactic acid concentrate, preferably contains from 2 to 5% by weight of natural lactic acid, about 85 to 90% of water and a residue of whey or skimmed milk constituents such as natural milk serum. The pH of the aqueous phase of the end product is buffered to a value of 5.3 to 6.2, in particular about 5.7 to 5.8, by the addition of the lactic acid concentrate. The first aqueous phase can be added in one step.

The second aqueous phase, the alkali and/or alkaline earth caseinate, which is preferably spray-dried prior to dissolution, is mixed in after homogenization and addition of the natural lactic acid concentrate described as first aqueous phase. The second aqueous phase preferably contains from 6 to 8% by weight of alkali and/or alkaline earth caseinate. The metal component preferably consists of sodium, potassium and/or calcium.

Casein, which is the main albuminous constituent of milk, is a protein which is stable to heat and consists of several fractions which differ only by a few amino acids. Casein is precipitated from skimmed milk by acidification from a pH of about 5.2 and lower or enzymatically by rennet. Precipitation is completed at a pH of about 4.6. The casein can be converted into soluble or dispersible caseinates by treating the casein suspension with alkali or alkaline earth solution.

For the known production of a caseinate solution, sodium caseinate obtained from skimmed milk and additional water, for example, are worked up in a separate mixing tank to a substantially 17% solution. The solution contains about 16.5% by weight of dry substance and has a pH of about 6.6. The mixing temperature lies in the range of 50° to 70° C. After pasteurization, the solution is cooled to about 20° C. and is metered and supplied to the cutting, mixing and kneading machine. The cooled caseinate solution is thickly liquid and highly viscous.

The dissolved alkali caseinate is added in at least two batches or continuously to the kneading mass already reacted with the lactic acid concentrate. If it is added in one batch, at least partial phase reversal can occur during the mixing and kneading operation and a liquid cream emulsion (oil-in-water) is formed instead of a butter emulsion (water-in-oil).

The water content of the end product is normally added exclusively as aqueous phase of the choice grade or table butter, of the lactic acid concentrate or of the caseinate.

In addition to the reduced fat content, the butter produced according to the invention has the following essential advantages:

As neither butter fat fractions nor chemical treatment processes nor phase conversion have been employed, all essential fatty acids of the choice grade or table butter remain, unchanged, in the food.

Despite the high water content, no water droplets issue when the butter is being spread.

The taste features of the choice grade or table butter are not changed because no additives have to be used.

The finished product has the lustre of choice grade or table butter.

The susceptibility to the growth of bacteria for a period of, for example, 21 days at a storage temperature of 5° to 8° C. is slight, even without preservatives.

The product obtained can also be used as a salted butter by adding at most 2% by weight of sodium chloride.

Owing to the present invention, the consumer can enjoy a butter which combines all physical, taste, hygiene and dietary properties of normal choice grade or table butter, but has substantially fewer calories.

What is claimed is:

1. A process for producing spreadable butter product with a reduced fat content form (1) a grade of butter selected from the group consisting of table butter, choice grade butter and mixture thereof, (2) a first aqueous phase having an acid buffer substance and (3) a second aqueous phase having milk proteins wherein the butter product produced comprises from about 30 to 60% by weight butterfat, from about 2 to 8% by weight lactic acid, from about 4 to 10% by weight of a caseinate compound selected from the group consisting of alkali earth caseinate, alkaline earth caseinate and mixtures thereof and a pH of 5.0 to 6.5 comprising the steps of heating the butter to a temperature of between 15° to 25° C. and beating the butter in a tightly sealed machine with cutting blades operating with a high shearing force so as to produce a finely cut butter mass, mixing and kneading said finely cut butter mass with a first aqueous phase comprising natural lactic acid concentrate and thereafter with a second aqueous phase comprising an alkali earth caseinate whereby the temperature of the product rises between 3° to 5° C. due to frictional heat during the kneading thereof.

2. A process according to claim 1 including carrying out the steps of cutting, mixing kneading under vacuum conditions at a pressure of from about 0.2 to 0.9 bar.

3. A process according to claim 1 including heating the butter to a temperature of between 18° to 22° C.

4. A process according to claim 3 wherein the butterfat content of the butter product is from about 30 to 50% by weight.

5. A process according to claim 3 wherein the butterfat content of the butter product is from about 40 to 45% by weight.

6. A process according to claim 1 including feeding the butter from a continuous butter making machine at a temperature of 14° to 15° C. prior to heating the butter.

7. A process according to claim 1 including mixing and kneading of the first aqueous phase and the second aqueous phase with the butter for a period of from about 2 to 8 minutes.

8. A process according to claim 4 wherein the lactic acid content of the butter product is from about 3 to 6% by weight and the content of the caseinate compound is from about 2 to 8% by weight.

9. A process according to claim 8 wherein the caseinate compound is selected from the group consisting of sodium caseinate, potassium caseinate, calcium caseinate, and mixtures thereof.

10. A process according to claim 1 including the steps of adding said first aqueous phase in a single batch and thereafter adding the second aqueous phase in a plurality of stages.

11. A process according to claim 1 wherein the pH of the butter product is from about 5.3 to 6.2.

12. A process according to claim 1 wherein the pH of the butter product is from about 5.7 to 5.8.

* * * * *